United States Patent [19]
Cunningham

[11] 3,762,745
[45] Oct. 2, 1973

[54] CONNECTION MEMBERS WITH HIGH TORQUE CARRYING CAPACITY
[75] Inventor: Robert A. Cunningham, Bellaire, Tex.
[73] Assignee: Hughes Tool Company, Houston, Tex.
[22] Filed: Apr. 3, 1972
[21] Appl. No.: 240,462

[52] U.S. Cl............ 285/92, 151/28, 285/330, 285/334
[51] Int. Cl............................................. F16l 15/00
[58] Field of Search................. 285/9 L, 24, 27, 285/333, 334, 330, 355, 390, 391; 151/28, 14 R

[56] References Cited
UNITED STATES PATENTS
| 571,067 | 11/1896 | Ebert | 151/14 R |
|---|---|---|---|
| 1,614,815 | 1/1927 | Wilson | 285/27 |
| 1,777,481 | 10/1930 | Block | 285/330 X |
| 2,469,993 | 5/1949 | Robson | 151/28 X |

Primary Examiner—Dave W. Arola
Attorney—Robert A. Felsman

[57] ABSTRACT

Connection members are disclosed for withstanding large torques but requiring relatively small make-up or breakout torques. They utilize threaded boxes and pins having their threads spaced to permit a selected amount of telescopic movement when initially connected. When telescoped to a predetermined position, locking means such as splined threads, capable of carrying large torques, engage or lock to prevent relative rotational movement between the members. A make-up means, such as a threaded sleeve, telescopes the locking means to a locked or an unlocked position. An alignment element or means is disclosed to align the splined threads for locking. Also, seal means are disclosed to prevent fluid flow past the threads if fluid flows through an axial bore in the members, as occurs when the members are used as tool joints in rotary well drilling.

6 Claims, 6 Drawing Figures

CONNECTION MEMBERS WITH HIGH TORQUE CARRYING CAPACITY

BACKGROUND OF THE INVENTION

1. Field of the Invention

This invention relates in general to means for releasably securing a pair of connection members, and in particular to members adapted to withstand large load induced operating torques while requiring relatively small make-up torques.

2. Description of the Prior Art

In some industries there is a need for connecting two rotary members by means that require reduced make-up torques, and yet which will result in a connection that can withstand large torques during operation.

In rotary well drilling, and sometimes in drilling in mining operations, sections of drill pipe are connected with rotary members commonly called "tool joints". Such joints consist of an externally threaded tubular member called a "pin" and an internally threaded tubular member called a "box".

Large torques are required to properly connect or "make-up" or to disconnect or "break-out" such connection members. These large torque requirements create problems in some instances. When large diameter drill pipe is used, for example, the make-up and break-out torque requirements may become excessive and difficult to conveniently obtain. Owing to the large torques applied during drilling, there is sometimes a tendency for the joints to become made-up even tighter, requiring large break-out torques.

In mining operations suitable equipment for applying large torques is frequently unavailable. This necessitated in the past the use of flange or other type connections that did not require large make-up or break-out torques. But these generally require additional time to connect and disconnect.

SUMMARY OF THE INVENTION

The invention may be summarized as one comprising a connection for rotary members that includes a threaded box and a threaded pin having their thread flanks axially spaced to permit selected telescopic movement when initially connected. Further, locking means prevent relative rotational movement of the threads when telescoped to a selected position. Alignment means positions the locking means for engagement, and makeup means engages the locking means. In the preferred embodiment a portion of the threads are splined or otherwise mated for mutual engagement to form the locking means and prevent relative rotational movement between the box and pin for withstanding large torques during operation. The mated locking means when in the form of splined threads preferably have offset leads on the pin and box to cause interengagement of the splines and splineways when telescoped to the selected locking position. A sleeve preferably functions as the make-up means and is threaded to the pin to engage the end of the box for forceably moving the splined portions of the threads into engagement. Moreover, when used as tool joints, there are seal means between the sleeve and the pin to prevent fluid flow along the threads. In addition it is preferable to provide a positive alignment means such as a mechanical stop means between the pin and box to accurately align the mated portions of the threads for subsequent locking engagement.

The above as well as other objects, features and advantages of the invention will become more fully apparent in the following detailed description.

DESCRIPTION OF THE PREFERRED EMBODIMENT

The illustrated embodiment has primary components that include a threaded box A and a threaded pin B. These members each have preferably solid threads on a portion C. Also they have slotted or splined threads on a portion D that serve as a locking means to lock the members together for rotation.

Figure 2:
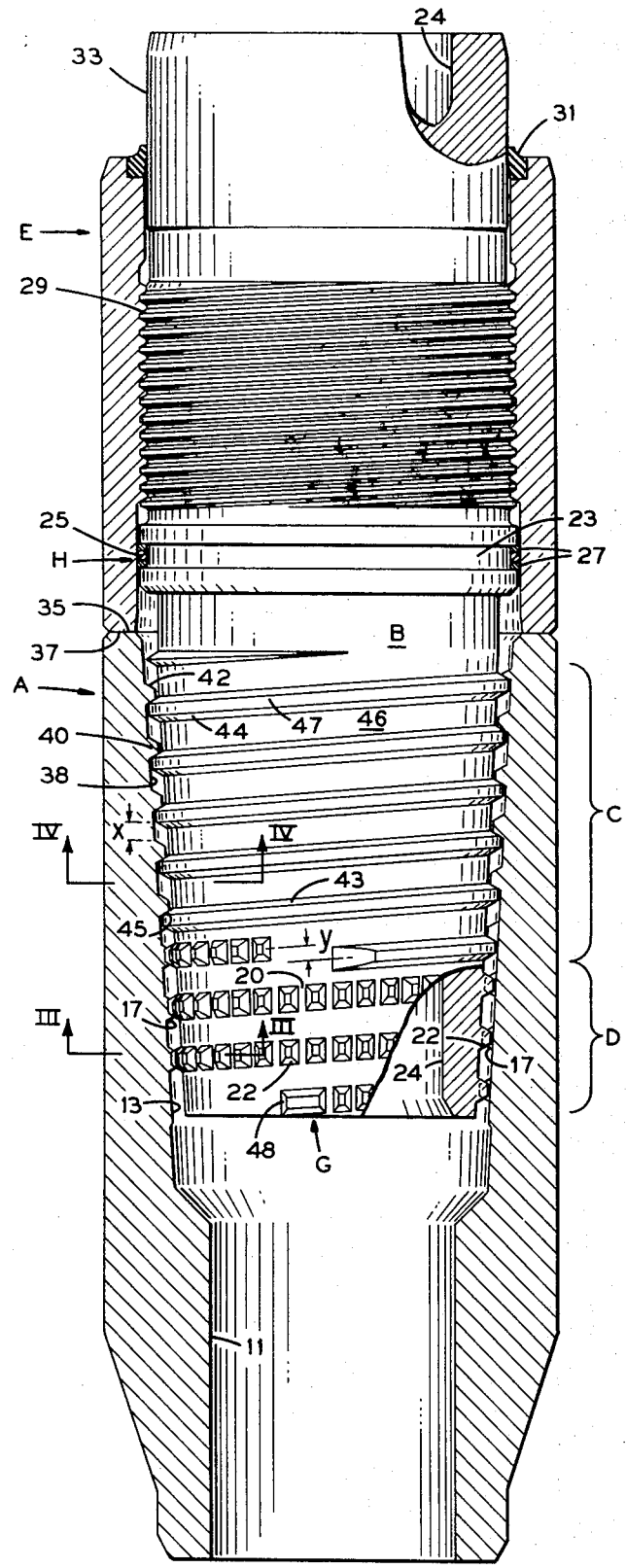
FIG. 2 is a longitudinal view in partial section of the rotary connection members after their final stage of connection, that is, after engagement of the locking means.
Figure 4:
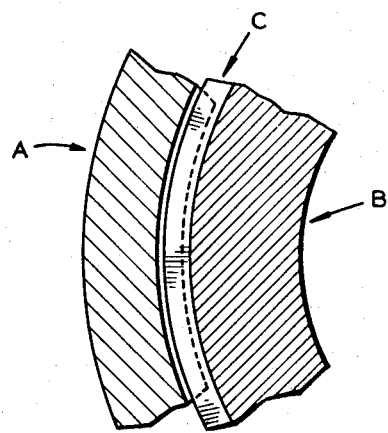
FIGS. 3 and 4 are fragmentary cross-sectional views as seen looking respectively along the lines III—III and IV—IV of FIG. 2.
Figure 3:
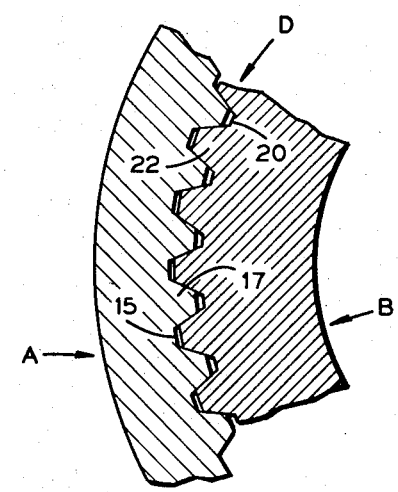

The opposed flanks of the threads of portion C are spaced axially to permit a selected amount of telescopic movement between the threads. When telescoped to the selected position shown in FIG. 2, the slotted portions D of the threads on the box and pin become mutually mated and locked. A make-up means E is used to hold the slotted portions D of the threads together. To insure proper radial alignment of the splined portions D in preparation for their axial interengagement, a stop means F (see FIGS. 5 and 6) engages the leading face of tooth G of the splined portion of the threads on the pin. Further, seal means H are provided between the sleeve and pin in fluid transmitting connections to prevent fluid flow along the thread surfaces.

Figure 5:
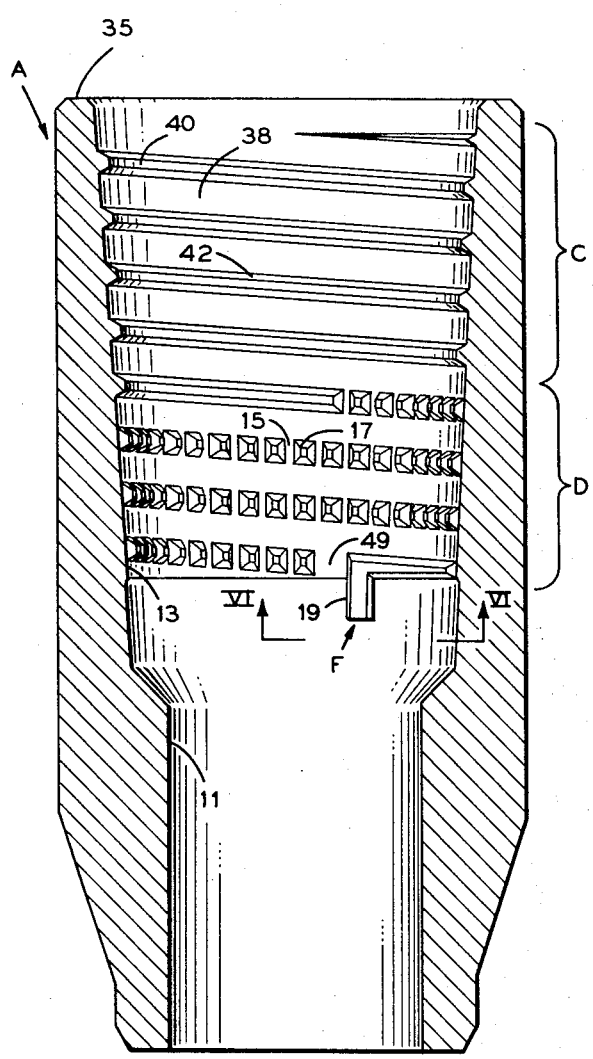
FIG. 5 is a view in longitudinal section of the box member showing an unslotted portion of the threads, and a slotted or splined portion of the threads that function as locking means. Also shown are stop means.

Referring now to FIG. 5, the box A is generally tubular and normally positioned to face upward as shown prior to connection with the pin member. Throughout the specification, the terms upward and downward will be used to indicate directions when the connections are positioned for use in rotary drilling, as shown in the drawing. The interior of the hox includes an axial bore 11 and a tapered surface 13 from which protrude the thread portions C and D, the latter being slotted to form splineways 15 and splines or teeth 17. The stop means F has a longitudinally extending face 19.

Figure 1:
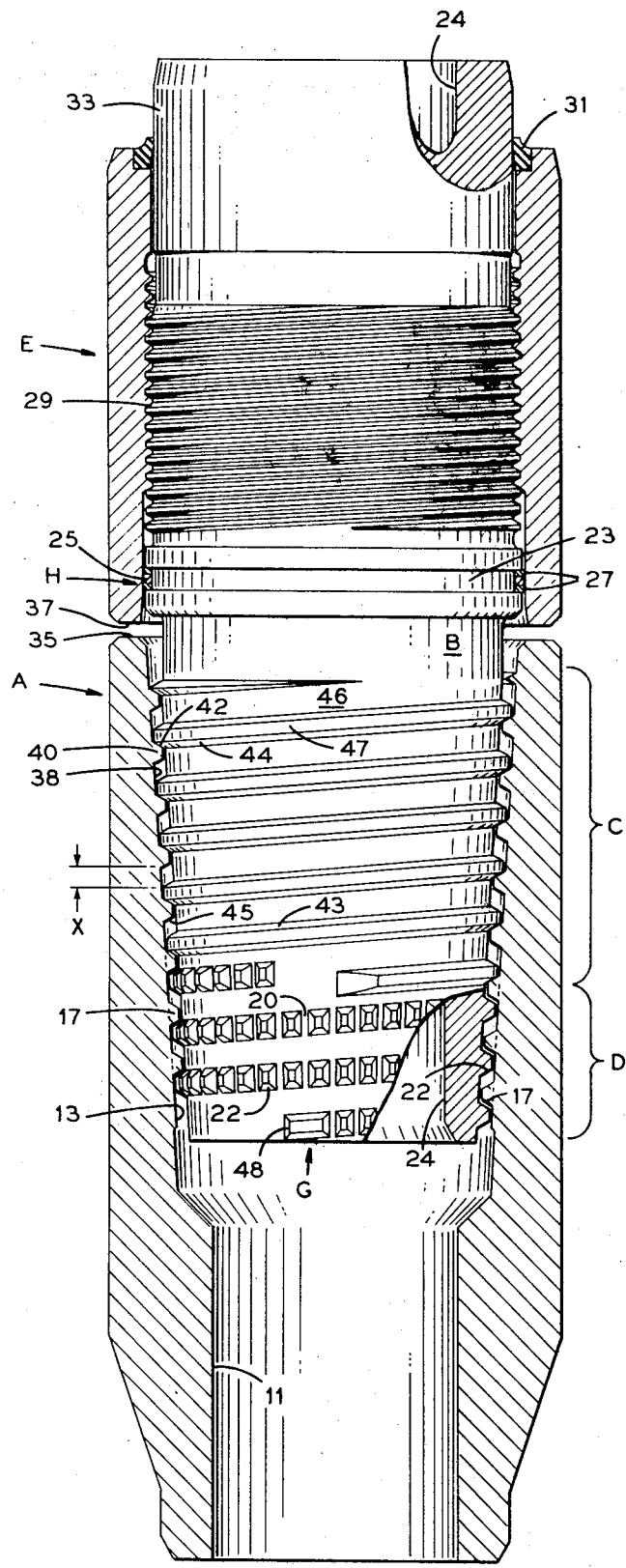
FIG. 1 is a longitudinal view in partial section of rotary connection members embodying the principles of the invention. The members are shown during their initial stage of connection before engagement of the locking means.

With reference to FIG. 1, the pin B is also generally tubular with a solid thread portion C and a slotted portion D with slots or splineways 20 that form teeth 22. Also, the pin has an axial bore 24 (see FIG. 2). The exterior of the pin has a circumferential groove 23 to receive an O-ring 25 and back-up rings 27, which are satisfactory components of a seal means H. Above the seal ring 25 is a region of the pin having threads 29 to receive engaging threads of the make-up means E, which in this instance is in the form of a tubular sleeve having a wiper ring 31 engaging a cylindrical surface 33 above the threads 29. The box A terminates in a radially extending shoulder 35, which is adapted to oppose and engage a radially extending shoulder 37 of the make-up means E. The thread portions C and D of the box form a continuous helix and have the same lead. The grooves 38 of the box are wider than threads 40. The lower flank 44 of solid thread portion C of the pin rides on the upper flank 42 of the box during make-up shown in FIG. 1. Further the solid threaded portion C of the pin has the same lead as the box and grooves 46 that are wider than the threads 47. The groove width of the solid portion C permits telescopic movement a selected distance X of the pin B relative to box A. The slotted or splined the threaded portion D of the pin mates and locks with the slotted and threaded portion D of the box when telescoped the selected distance X, due to the off-set Y between the slotted portion D and solid portion C of the threads on pin B.

For radial alignment on the splined teeth 17 of the box A with the slots 20 of the pin the leading face 48 of leading tooth G engages the face 19 of the stop means F. Two or more teeth G may connect for added strength as shown. If so, a corresponding gap 49 (see FIG. 5) is formed in the thread of the box by removing one or more teeth.

Figure 6:
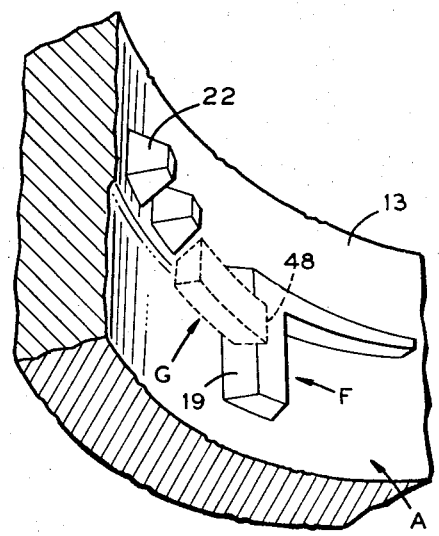
FIG. 6 is a fragmentary perspective view showing the engagement of the stop means with the leading face of the splined thread of the pin member, which together form the alignment means.

In operation, and referring initially to FIG. 1, the pin member B is positioned above the box member A. The pin is then lowered and rotated clockwise, as seen from above for the threads shown, until the leading face 48 of tooth G engages the face 19 of stop means F of the box, as indicated in FIG. 6. Then the make-up means, here sleeve E, is made-up such that its shoulder 37 engages the shoulder 35 of the box. Additional rotation of the make-up means E causes the thread portions C and D of the pin to telescope a distance X to the position shown in FIG. 2. Alternatively, the pin may be moved the distance X relative to the box by externally applied force. In this position the upper flanks 43 of the pin engage the downwardly facing flanks 45 of the box with a force determined by the amount of torque applied between the make-up means E and the box A.

As a consequence of using the above preferred structure, significant advantages are achieved. The interengagement of splined portions D of the box and pin caused by the telescopic movement to the position shown in FIG. 2 enables the connections to withstand extremely large torques. This is achieved with a relatively small amount of make-up torque. Use of the connections in rotary drilling with excess torque does not increase the make-up between the box and pin. Thus, the connection may be broken-out as easily as it is made-up. This is especially advantageous in rotary drilling encountering large torques, in drilling large diameter holes requiring large connections, and in mining operations where it is inconvenient to provide equipment capable of applying large torques for make-up and break-out. Increased torque during drilling does not additionally make-up the connection. Additional make-up in conventional connections has the effect of storing energy which occasionally results in failures from hydrogen embrittlement when the proper environment is present. Further, the connection can be rotated safely in either direction, which is especially advantageous in directional drilling and in shaft drilling. The torsional strength of the connections is higher than even that of high strength pipe.

While the invention has been shown in only one of its forms, it should be apparent to those skilled in the art that it is not so limited but is susceptible to various changes and modifications without departing from the spirit thereof. For example, within the broad concept of the invention the locking means is not limited to splined thread teeth. The location of the locking means can be varied and need not be at the bottom of the pin as shown in the drawing. The invention may be used with either left or right hand threads. The form and location of the stop means may vary. These modifications are but a few of those that will occur to those of average skill in the art.

I claim:

1. A connection comprising:
   a threaded box;
   a threaded pin;
   the thread flanks of the pin and box being axially spaced to permit selected telescopic movement of the pin and box;
   locking means carried between the box and pin to prevent relative rotational movement of the threads when telescoped to one position;
   a rotatable make-up means carried by a selected one of the box and pin to position and lock said locking means to prevent either rotational or axial movements between said box and pin.

2. A connection comprising:
   an internally threaded box;
   an externally threaded pin adapted to be received by the box;
   the threads of the pin and box having flank spacing adapted to permit the threads to telescope a selected axial distance;
   a portion of the said threads of both the box and pin being solid and another portion being splined and adapted to lock to prevent relative rotational movement between the box and pin;
   a make-up means carried by a selected one of the box and pin to cause forceful engagement of opposed flanks of the solid threads and hold the the spline portions of the threads in locking engagement to prevent either rotational or axial movements between said box and pin.

3. A connection for withstanding high torques said connection comprising:
   an internally threaded box;
   an externally threaded pin;
   the thread flanks of the pin and box being axially spaced to permit limited telescopic movement of the box and pin when made-up;
   a portion of the thread flanks of both the pin and box being slotted, with the slotted portion of the pin being adapted to lock with the slotted portion of the box upon selected telescopic movement;
   a sleeve threaded to the pin to engage the end of the box for forceably moving the opposed flanks of the solid portions of the threads together and locking the slotted portions of the pin and box together.

4. A connection comprising:
   an internally threaded box having an axially extending opening;
   an externally threaded pin having an axially extending opening;

the threaded flanks of the pin and box being axially spaced to permit limited telescopic movement between the box and pin when made-up;

a portion of the threaded flanks of both the pin and box being slotted, with the slotted portion of the pin being adapted to lock with the slotted portion of the box upon said telescopic movement;

a sleeve threaded to the pin to engage the end of the box for forceably moving the opposed flanks of the solid portions of the threads together and locking the slotted portions;

seal means between the sleeve and pin to prevent fluid flow along said threads.

5. A tool joint connection comprising an internally threaded box having an axially extending opening;

an externally threaded pin having an axially extending opening;

the threaded flanks of the pin and box being axially spaced to permit limited telescopic movement of the box and pin;

a portion of the threaded flanks of both the pin and box being slotted, with the slotted portion of the pin being adapted to lock with the slotted portion of the box upon said telescopic movement;

a sleeve threaded to the pin to engage the end of the box for forceably moving the opposed flanks of the solid portions of the threads together and locking these slotted portions.

alignment means between the box and pin to align the slotted portions of the threads for locking.

6. A tool joint connection comprising:

an internally threaded box having an axially extending opening;

an externally threaded pin having an axially extending opening;

the threaded flanks of the pin and box being axially spaced to permit limited telescopic movement of the box and pin;

a portion of the threaded flanks of both the pin and box being slotted, with the slotted portion of the pin being adapted to lock with the slotted portion of the box upon said telescopic movement;

a sleeve threaded to the pin to engage the end of the box for forceably moving the opposed flanks of the solid portions of the threads together and locking these slotted portions.

seal means between the sleeve and pin to prevent fluid flow along said threads;

alignment means between the box and pin to align the slotted portions of the threads for locking.

* * * * *